United States Patent [19]
Roberts et al.

[11] 3,911,362
[45] Oct. 7, 1975

[54] STATISTICAL ANALOG MONITOR

[75] Inventors: Gary A. Roberts; Ernest C. Fitch, Jr., both of Stillwater, Okla.

[73] Assignee: Board of Regents for the Oklahoma Agricultural and Mechanical Colleges Acting on Behalf of Oklahoma State University of Agriculture and Applied Science, Stillwater, Okla.

[22] Filed: May 17, 1974

[21] Appl. No.: 471,128

Related U.S. Application Data

[63] Continuation-in-part of Ser. No. 302,104, Oct. 30, 1972, abandoned.

[52] U.S. Cl.................................. 324/182; 324/94
[51] Int. Cl.² ........................................... G04F 8/00
[58] Field of Search........................ 324/78, 94, 182

[56] References Cited
UNITED STATES PATENTS

| | | | |
|---|---|---|---|
| 3,148,328 | 9/1964 | Murrell et al. ........................ | 324/78 |
| 3,777,266 | 12/1973 | Marwell .............................. | 324/182 |

Primary Examiner—Alfred E. Smith
Assistant Examiner—Michael J. Tolrar

[57] ABSTRACT

This abstract describes an instrument for the statistical study of the various analog parameters of a physical operation, which vary with time. The parameters may be, for example, voltage, pressure, volume, etc. A selected one of these parameters is converted by means of a transducer to an electrical voltage, which is proportional to the value of the parameter at all times. This voltage is continuously compared with a reference voltage of a selected magnitude, and means are provided in response to this comparison to record the accumulated time intervals during which the parameter voltage is different in a selected manner from the reference voltage. Means are also provided for determining the number of such times when the parameter voltage is different from the reference voltage, during a selected total time interval. By using a plurality of such systems each with a different reference voltage, statistical data can be accumulated in a simple and inexpensive manner.

In an improved embodiment, the voltage comparator is designed to provide a hysteresis characteristic, in which it turns on at a given value of the variable and turns off at a lower or higher value of the variable. Also, in the use of an electrolytic cell to count pulses, the embodiment includes the design of an improved pulse shaper. Means are also provided for limiting the time duration of the entire test period and providing means to shut off power when the time limit is reached.

11 Claims, 9 Drawing Figures

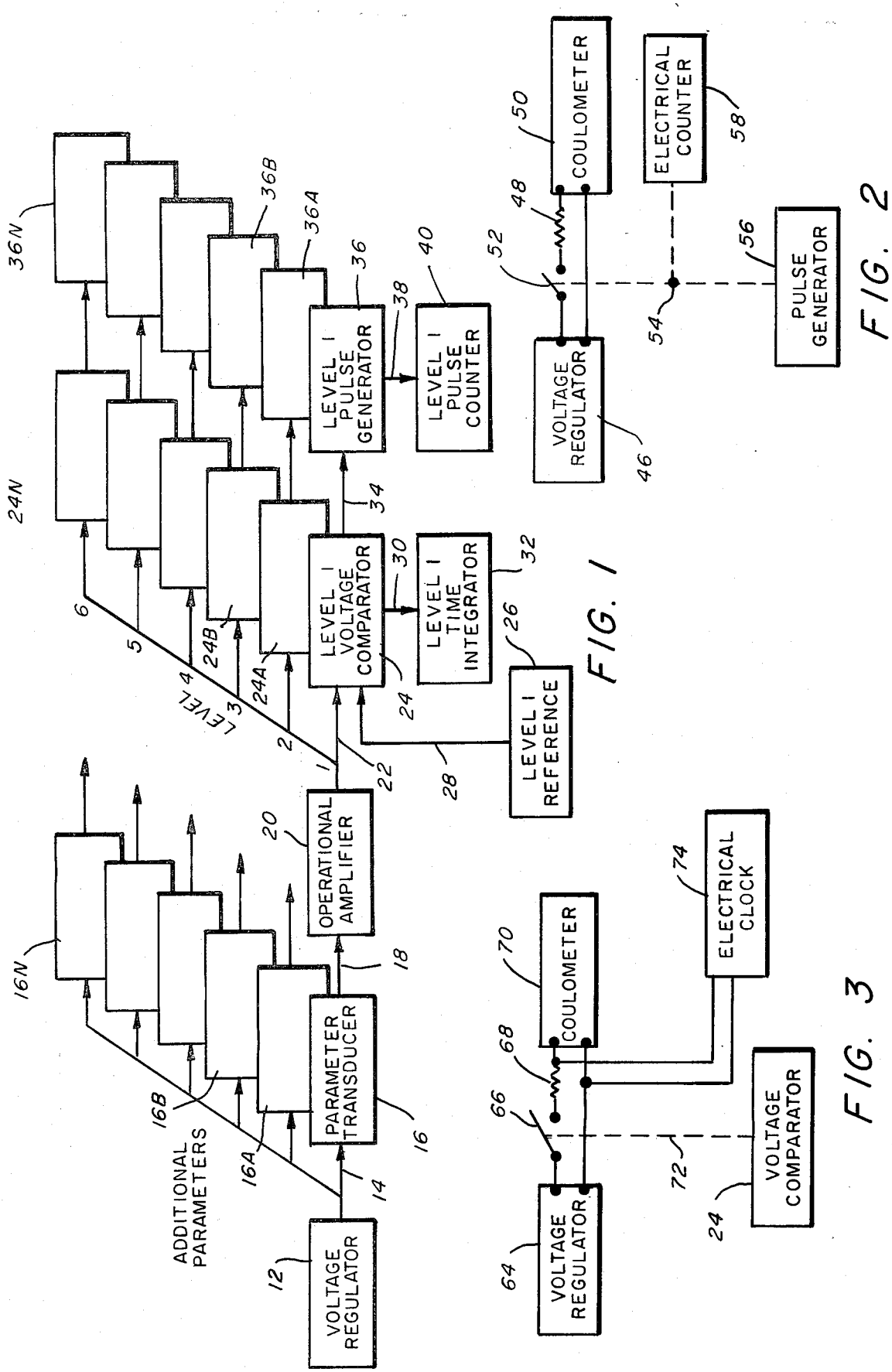

STATISTICAL ANALOG MONITOR

CROSS REFERENCE TO RELATED APPLICATION

This application is a continuation-in-part of Ser. No. 302,104 of the same title, by the same inventors, filed Oct. 30, 1972, and abandoned as of the date of this application.

BACKGROUND OF THE INVENTION

This invention is in the general field of electrical measuring instruments. More particularly, it is concerned with the acquisition of statistical data of the performance of analog variables.

In the prior art, parameters of an operation which vary with time are generally studied by making a time record of the variations. This can be an analog record which is later scanned to provide whatever statistical information may be needed. Also, it is possible to digitally record the value of a parameter as a function of time. This digital record of the analog function can be analyzed in a computer, in such a way as to provide statistical information similar to that provided by this apparatus. However, these prior art systems are much more clumsy and expensive, and is not readily available for measurements of such functions in the field.

SUMMARY OF THE INVENTION

It is the primary object of this invention to provide a small, self-contained portable instrument that can be used in field operations to make statistical measurements on analog variables.

These and other objects are realized and the limitations of the prior art are overcome in this invention by which a varying D.C. voltage is provided which is proportional at all times to the analog variable being studied. This voltage is scanned as a function of time, at one or more levels of reference voltage, so that the total accumulated time during which the signal voltage is greater than a selected reference voltage is recorded. Also the number of times that the signal voltage is greater than a reference voltage within a selected total duration of test is recorded. These measurements are made with simple, small, portable instruments so that they can be taken to the field. They are completely self-contained and self-powered. The apparatus provides means for carrying out the following steps: providing a regulated voltage, utilizing a means to convert the variable parameter to a variable voltage, amplifying the transduced voltage, comparing the amplifier output with a reference voltage of selected magnitude, and during a given total duration of tests measuring the accumulated or integrated time during which the signal voltage applied to the comparator is greater than the selected voltage, and counting also the number of times that the signal voltage is greater than the reference voltage.

Means are provided for operation the voltage comparator on a hysteresis characteristic, so that there will be a gap in the values of the characteristic variable at which the comparator turns on, and the lower or higher value of the variable at which it turns off. This is for the purpose of making the system insensitive to noise variations, or noise pulses, which are of a magnitude less than this interval between the value of turn-on and turn-off. Also, in the use of an electrolytic cell as a pulse counter, the invention involves the use of a pulse shaper to provide square pulses of selected amplitude and time duration, so that each pulse will contribute a selected magnitude of electrical charge to the cell. Also means are provided for limiting the total time duration of the testing period to a selected value and providing means for turning off the applied voltage to the test apparatus when this time limit occurs.

BRIEF DESCRIPTION OF THE DRAWINGS

These and other objects of this invention and a better understanding of the principles and details of the invention will be evident from the following description taken in conjunction with the appended drawings, in which:

FIG. 1 is a block diagram representation of the system of this invention.

FIGS. 2 and 3 provide alternative details of the apparatus.

DESCRIPTION OF THE PREFERRED EMBODIMENT

Figure 4:
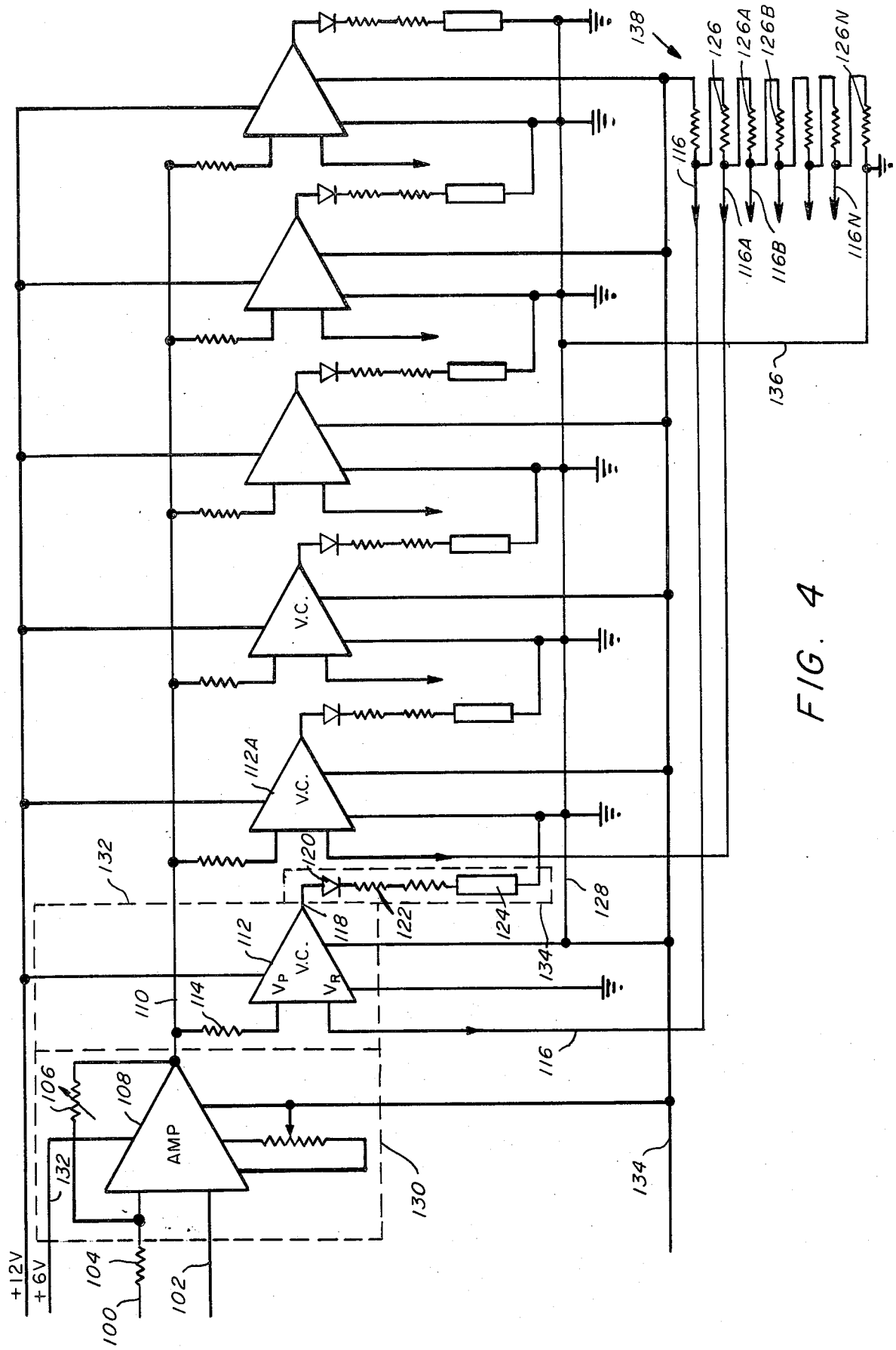
FIG. 4 provides a detailed circuit diagram of a portion of the amplification and voltage comparison portions of the apparatus.

In the study of various types of electrical, mechanical, hydraulic, etc., apparatus, it is important to know how these parameters vary with time. The customary method of recording and displaying the manner in which these parameters vary with time is to provide a record trace on which a line varies in amplitude as a function of time.

It is very difficult to utilize this trace record in converting it to quantities of interest. One way that these data can be utilized is to convert the analog trace into a series of digital numbers, insert these numbers into a computer, and using the computer to statistically analyze data, to provide information regarding, for example, the fraction of total time that the parameter of interest is greater or less than a selected value, and the number of times during a given total interval of time during which the parameter is greater or less than a selected value. These data on integrated time, and number of times, that the selected parameter is greater or less than a reference value are of interest in determining the work cycle, or duty cycle, of that parameter and are useful in determining possible failure characteristics and other problems associated with such equipment.

By the use of computers it is possible to analyze digital representation of the analog variations of the parameter, to provide the statistical data just discussed. However, the recording apparatus is complex, heavy and expensive and the computer time is also expensive. Thus, this type of statistical analysis does not lend itself well to the kind of instrumentation that is needed today for studying parameter variations in the field.

This invention utilizes a very simple principle to acquire the statistical information, so that by the use of simple, small, inexpensive apparatus these data can be accumulated and utilized for practical purposes.

Referring now to FIG. 1, there is shown in block diagram the essential features of this invention. A voltage regulator 12 is provided to produce a regulated voltage which goes by lead 14 to a transducer 16 which transduces the analog parameter and produces an electrical voltage on lead 18. The magnitude of this voltage is proportional to the magnitude parameter being measured. This voltage is amplified in an operational amplifier 20 of conventional design and the output of the operational amplifier goes by way of lead 22 to a voltage comparator.

This voltage comparator is an amplifier that has two inputs, one of which is the signal from the transducer, and the other is a regulated voltage of selected magnitude against which the signal is to be compared. When the signal voltage is less than the reference voltage the output of the voltage comparator is logical zero. When the signal voltage is higher than the reference voltage the output voltage of the comparator is a logical 1, that is, a constant D.C. voltage of selected magnitude. The voltage comparator is a commercial device and is well known in the art and needs no further description. Suffice to say that it acts like a voltmeter that closes a switch whenever the signal voltage is higher than the reference voltage. This switch then applies a voltage of selected D.C. magnitude through lead 30, for example, to a current integrator 32 or coulometer, which will be described in detail later.

The voltage comparator output goes by way of leads 34 to a pulse generator 36. This is a device, many versions of which are available on the market, which when an input voltage goes from zero to a positive value (or to a negative value) will generate a pulse of selected amplitude and time duration. A common version of this instrument is what is called a "one shot multivibrator" well known in the art. When the input voltage goes from a positive (or negative) value to zero nothing happens and no additional pulse is provided until the voltage input again goes from zero to a positive (or to a negative) value. Having a pulse generated of constant voltage and of precise time duration it is possible to count these pulses by means of an electrical pulse counter, or as will be shown in FIG. 2 to provide a current integrator which will, in effect, count the number of pulses generated by the element 36 in terms of the total charge passed in the form of these short current pulses.

A group of boxes 16A, 16B . . . 16N etc., go to individual operational amplifiers such as 20. Each operational amplifier such as 20 has a plurality of voltage comparators such as 24, which are set to different levels of reference voltage. Thus, the statistical quantities of integrated duration and number of times can be accumulated as a function of the different values of the reference voltage. It is these data taken at different reference levels, which provide the type of information that is required. Similarly each of the voltage comparator boxes 24A, 24B, 24N are connected to corresponding pulse generators 36A, 36B, 36N.

In FIG. 2 is shown a means by which the number of pulses produced by the element 36 can be counted. Here is shown a source of regulated voltage 46, the ouput of which goes through switch 52 to resistor 48 to a coulometer 50. The pulse generator 36 of FIG. 1 can be thought of as a fast acting electronic switch equivalent to the pulse generator 56 of FIG. 2 operating a mechanical switch 52 so that during each pulse of the pulse generator, current will flow from the regulated voltage 46 through the resistor 48 and a precisely measured quantity of charge will flow through the coulometer 50. The total accumulated quantity of current, or charge, is therefore a measure of the number of individual pulses since each pulse provides a measured precise value of charge passing into the coulometer. Another way of measuring the number of counts, of course, is by means of a conventional electrical pulse counter 58, which is connected to the output of the pulse generator 56.

Referring now to FIG. 3, the voltage comparator 24 is equivalent to the same element of FIG. 1. This is equivalent to a switch. The switch is closed whenever the signal voltage is greater than the reference voltage and open at all other times. The total time duration of this closing can again be measured by the flow of a metered constant current from a regulated voltage source 64 through the switch 66, through resistor 68, through the coulometer 70. The total indication on the coulometer gives a measure of the total time during which the switch 66 has been closed within a total time duration T. This indication is an integral of the time during which the signal voltage is higher than the reference voltage.

It is, of course, equivalent to use an electrical clock 74 tied across the circuit in parallel with a coulometer to measure total time duration during which the switch 66 of the voltage comparator is closed.

Conventionally, one might therefore be expected to use an electrical pulse counter 58 to measure the number of pulses during a given total duration T and/or an electrical clock 74 to measure the integrated time within the period T that the switch 66 of the voltage comparator is closed. However, by the use of the coulometer a very simple, inexpensive, small lightweight rugged device can be produced. Such a coulometer is a commercial device and may be purchased on the market from Curtis Instruments, Inc., 200 Kisco Avenue, Mount Kisco, New York 10549. These instruments are patterned on the principle of U.S. Pat. No. 3,045,178, and operate on currents as low as one microampere to provide an indication, on a scale of approximately 0.65 inches length, representing full scale hours of from 100 up to 3,000 or more. These coulometers are approximately one-quarter inch square by about one inch long and are simple, rugged, lightweight and inexpensive. Their indications can be read easily and with good precision. Their accuracy is approximately plus or minus 2 percent. Consequently, by using circuits such as those shown in FIGS. 2 and 3 and using a simple, regulated voltage from a zener diode or equivalent, a simple, rugged device for the purpose of obtaining the typical data, that is, a simple precise statistical analog monitor can be provided.

Since the art on parameter transducers such as those for measuring displacement, pressure, etc. which are resistive or inductive in nature are well known in the art, it is not necessary to provide detailed information on these. The operational amplifier 20 is illustrated in the dashed box 130 while the voltage comparator is shown in detail in the dashed box 132 and the integrator 32 is shown in box 134.

The operational amplifier 108 is provided with a plus voltage of six volts and a minus voltage of five volts through leads 132 and 134. The input signals from the transducers come on leads 100 and 102 into the amplifier. The output of the operational amplifier 108 appears on lead 110, and part of this energy is fed back to the input through resistor 106. This amplifier in operation has a gain of about five to one. It is of conventional design well known in the art.

The first input to the voltage comparator 112, that is, to the $V_p$ (or voltage of the parameter input) comes from the output 110 of the operational amplifier. The input $V_R$ (or reference voltage input) is fed with a constant regulated D.C. voltage through lead 116 from a potentiometer 138 of fixed precision resistors. These are tied between the minus five volts, lead 134 and ground lead 136. By this means a series of reference voltages 116, 116A, 116B . . . 116N are provided, each of which goes to a separate voltage comparator 112. The voltage on lead 116 is a negative voltage of less than five volts to ground. The output of the amplifier 108 is a negative voltage which varies from zero in a negative direction. When it is more negative than the reference voltage, the switch such as 66 in FIG. 3 closes and current then flows to the coulometer 70. The output of the voltage comparator on lead 118 now goes to the coulometer circuit which comprises a diode 120, series resistor 122, and a coulometer 124, such as that described in conjunction with FIG. 3.

This diagram does not show details of the pulse generator, which will be described in conjunction with FIG. 6. The pulse generator would be connected between line 118 and ground line 128. Additional voltage comparators such as 112A are shown in the diagram. Their inputs are all connected in parallel across line 110, which is the output of the amplifier 108. The reference input of each comparator is connected to a different one of the terminals 116A, 116B, etc. of the potentiometer 138. Further description of the other voltage comparators is not necessary except to point out, as indicated in the drawing, that the reference voltages on succeeding voltage comparators are lower in the negative direction than the reference voltage on line 116 for example. So that the statistics provided on the voltage output of the second voltage comparator 112A will provide different statistical data than that provided by voltage comparator 112.

Figure 5:
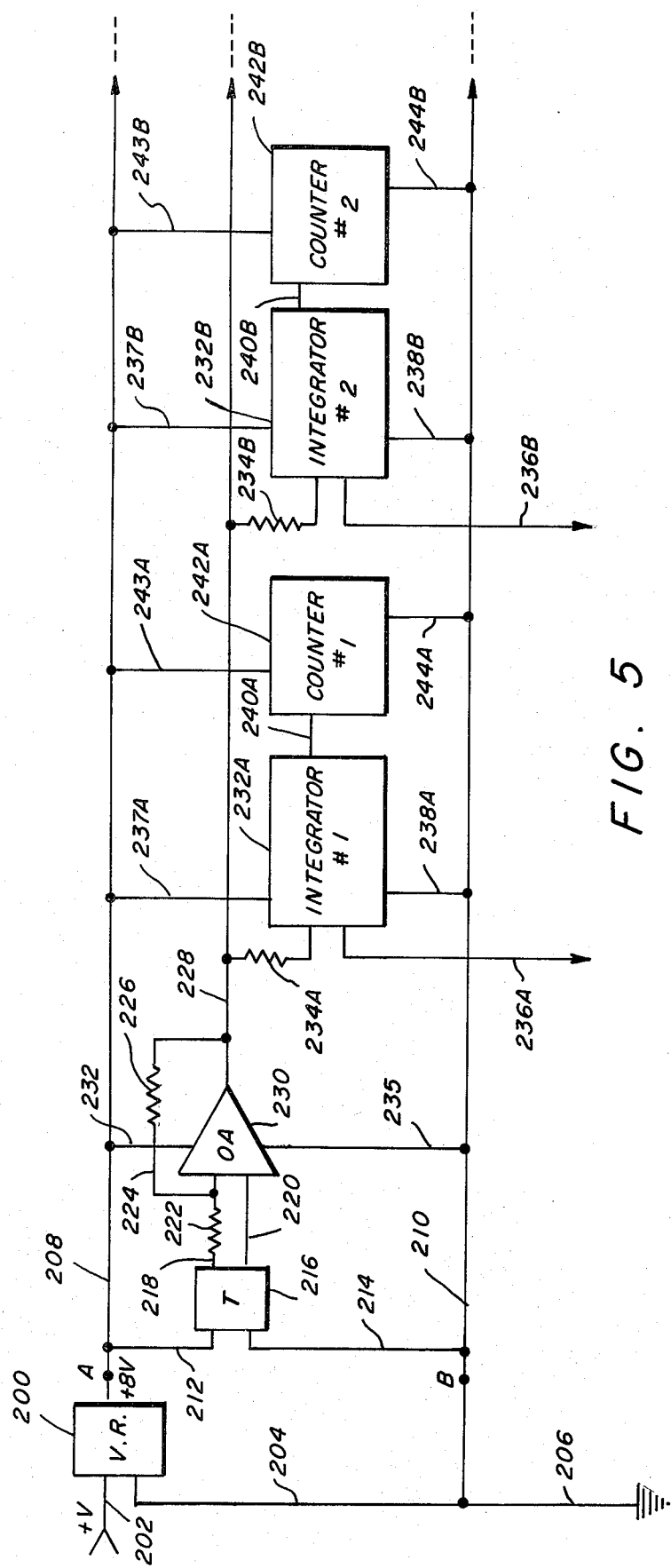
FIG. 5 illustrates an improved electrical circuit diagram of the statistical monitor apparatus.

FIG. 5 shows a modification of the circuit of FIG. 4 which differs from the conventional apparatus systems in the use of a precision voltage regulator 200 to which a D.C. voltage source is applied between the input lead 202 and the lead 204 to ground 206. The output of the voltage regulator 200 at the points A and B, is a precise value of voltage of selected value, such as 8.0 volts. The line 208 represents the plus 8 volts and line 210 represents ground. A transducer T indicated by numeral 216 is supplied with voltage from lines 208 and 210, through the medium of leads 212 and 214. The output of the transducer 216 between lines 218 and 220 represent an electrical voltage which is a function of the magnitude of a selected variable V. The transduced signal between leads 218 and 220 is fed to the input of an operational amplifier 230, through a selected resistance 222. Voltages are supplied to the amplifier 230 by means of leads 232 and 235. The output of the operational amplifier 230 is fed back from the output lead 228 through a selected resistance 226 to the input, to provide an improved amplifier characteristic. The lead 228 now represents the instantaneous value of the variable V in terms of signal voltage $E_S$. As will be shown in FIG. 7, means are available to provide a plurality of reference voltages numbers 1, 2 . . . N. These represent selected values of reference voltage against which the value of these signal voltages $E_S$ will be compared in the apparatus of FIG. 5. Lead 236A, for example, connects to the first lead of the resistor combination of FIG. 7, and represents a constant selected value of voltage $E_R$ against which the value of signal voltage $E_S$ on line 228 will be compared. Voltage $E_S$ on lead 228 is applied through resistor 234A to the input of an integrator circuit number 1 indicated as numeral 232A. The details of the integrator circuit will be clarified in connection with description of FIG. 6. The output on line 240A of the integrator 232A is a voltage which represents the relation between $E_S$ and $E_R$. When the voltage $E_S$ and $E_R$ differ in a selected manner, for example, when the voltage $E_S$ is less than $E_R$ the output on line 240A is zero. When the voltage $E_S$ on line 228 is greater than the value $E_R$ on 236A, the output on line 240A will be a selected constant voltage $E_P$. $E_P$ will be used to control an event counter 242A, the details of which will be shown in greater detail in FIG. 6. There are a plurality of pairs of circuits similar to integrator 1 and counter 1, such as integrator 2, counter 2, and so on. Each of these pairs of circuits are supplied with a different value of reference voltage $E_R$ on leads 236A, 236B and so on. Supply voltages are supplied from line 208 to each of the units 232 and 242 by the leads 237A, 243A, 237B, 243B and so on, and similar voltage connections to ground 238A, 244A, 238B, 244B and so on.

Figure 6:
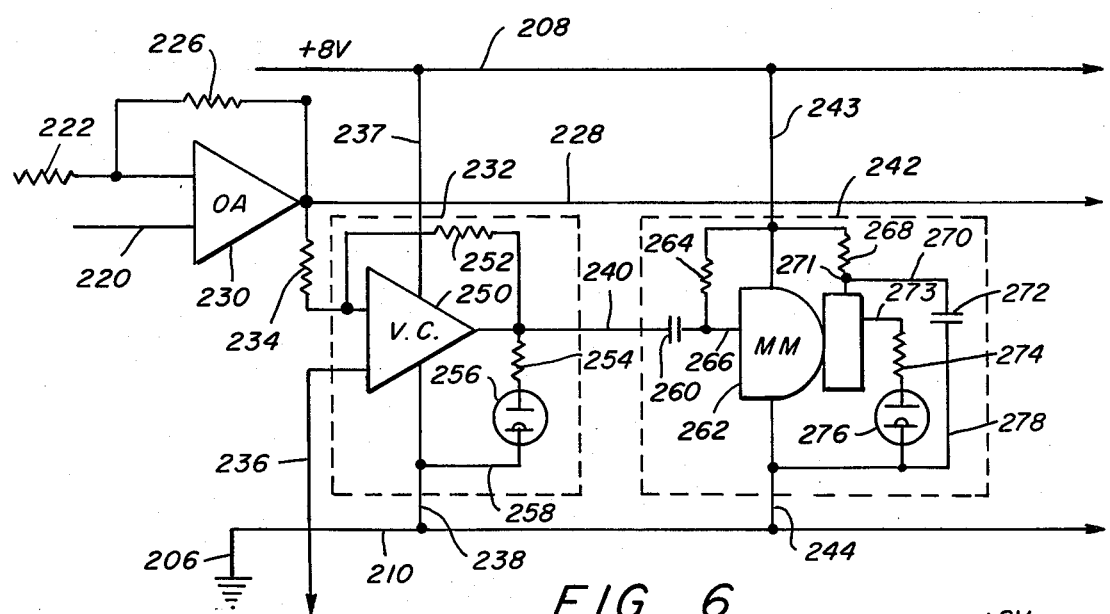
FIG. 6 shows the detailed electrical circuit of the charge integrator and pulse counter.

Referring now to FIG. 6 there is shown a portion of the circuit of FIG. 5 beginning at the operational amplifier 230 showing the input resistance 222 and the second lead 220, which carry the signal voltage $E_S$ from the transducer 216 corresponding to the variable V. The feedback resistance 226 is shown from the output lead 228 back to the input of the amplifier 230. The dashed box 232 represents the integrator circuit shown by box 232A in FIG. 5. The dashed box 242 shows the internal circuit corresponding to the counter 242A, and so on. The instantaneous voltage $E_S$ of the variable V which appears on line 228 is fed into the voltage comparator 250 through input resistance 234 and the other input terminal is connected through lead 236 to the first reference voltage. The output lead 240 of the voltage comparator 250 is fed back through resistance 252 to the input, for a particular purpose.

The voltage comparator is a device for comparing the voltage on the input leads, one of which is connected to an unknown voltage and the other of which is connected to a reference voltage. When the unknown voltage $E_S$ is, for example, less than the reference voltage $E_R$ the output on line 240 is zero. When the voltage $E_S$ on the input becomes equal to or greater than the $E_R$ then a constant voltage of selected magnitude $E_P$ appears on line 240. Similarly, when the voltage $E_S$ decreases and becomes less than the value of $E_R$ the voltage $E_P$ disappears from line 240. This is the normal method of operation of a voltage comparator.

However, if there should be electrical noise on the line 228, it will be clear that the signal being compared by the voltage comparator will be $E_S$ plus noise. Assume that the signal voltage on line 228 corresponding to the transducer signal $E_S$ is just slightly less than $E_R$.

Then when an oscillating noise appears on line 228 so that the noise plus the signal $E_S$ is greater than $E_R$ then voltage $E_P$ will appear on line 240. When the noise become zero or negative, the voltage $E_S$ plus noise is less than $E_R$ and the voltage $E_P$ disappears. Thus the number of times the voltage $E_P$ appears on line 240 will vary in accordance with the number of times that the noise value becomes large enough to cause switching of the voltage comparator, and may have nothing to do with the number of times that the voltage of $E_S$ is greater than $E_R$, which is the quantity of interest.

The feedback of voltage provided by resistor 252 serves the important purpose of making the dropout voltage of the voltage comparator, that is, the voltage on the input leads $E_S$, which will cause dropout of the voltage $E_p$ at 240, to be less than the value of $E_r$ on lines 236. In other words it takes a higher voltage of $E_s$ to turn on the voltage $E_p$ on line 240 than it does to turn it off. This is a type of hysteresis characteristic. If the spread between the turn-on and turn-off voltage of $E_s$ or the $\Delta E_s$ is larger than the amplitude of noise on line 228 which is added algebraically to the signal $E_s$, then this circuit will be insensitive to noise variations, and the voltage $E_p$ on line 240 will occur only when $E_s$ is greater than the value of $E_r$ to trigger the voltage comparator.

The output voltage $E_p$ on line 240 is present only when the value of voltage $E_s$ is greater than $E_r$ and it is desired to integrate the total time that this occurs. This is done by applying the voltage on line 240 through a resistor 254, which provides a current which is proportional to the voltage $E_p$ on 240. This current is passed through an electrolytic cell 256 in which an electrode is plated by metal, from solution, the amount of metal plated being exactly proportional to the total charge passed through the cell. Thus, even though the current goes in short variable length pulses the total metal plated will be the integral of the time during which the voltage $E_p$ appears on leads 240.

There are many types of electrolytic cells which are designed for the purpose of integrating time, or counting pulses etc., which operate on the basis of plating metal out of solution onto a selected electrode. One of these is the E Cell manufactured by Plessey Electro-Products Company of 3860 Centinela Avenue, Los Angeles, Calif. 90066, which is available on the market. The integrator, which is the purpose of the box 232, is to integrate times when the voltage $E_p$ is on the line 240. This is done by passing a current $I_p$ proportional to the voltage $E_p$, through the cells 256 and through the lead 258 to ground.

Means are provided, which are applied to the cell at some time after the test, to determine the amount of metal that has been plated on the electrode. This is done by applying a reverse voltage to the cell 26 and determining the amount of charge represented by current, and time, to remove the plating and place it back into the solution. This method of readout of the cells 256 is a subject separate from this invention, and is covered by various designs of apparatus which have been devised for reading out the integrated measure of charge carried by these cells 256.

A second very important quantity concerned with the gathering of statistical data is the number of times, in a given total duration of time, that the variable $E_s$ is different from $E_r$ in a selected manner, such as for example, that $E_s$ is greater than the reference value $E_r$. Assume that the value of $E_s$ fluctuates from a value below $E_r$ to a value above $E_r$, and back below and so on. The number of times that the value of $E_s$ crosses the value of $E_r$ is recorded in the counter indicated by the dashed box 242.

The counter 242 comprises a mono-stable multi-vibrator 262 which can be set by a drop in voltage on its input on line 266. This drop in voltage occurs when the voltage $E_p$ disappears from the line 240, in other words, when the voltage comparator drops its output $E_p$ to zero, the voltage on one terminal of the capacitor 260 drops to a low value. The other terminal of the capacitor 260 is held to a selected voltage by the resistor 264 when the voltage 240 drops to zero a current pulse is passed through the capacitor 260 to line 266 to the multi-vibrator 262 which is then set. This means it puts out a constant voltage on the output lead 273.

The operation of the monostable multi-vibrator is such that a capacitor 272 can be connected by line 270 to point 271 and to ground through line 278. When the multi-vibrator is set, current flows to the capacitor 272. When the capacitor is charged it resets the multi-vibrator, and turns off the voltage on line 273. In other words, each time that the monostable multi-vibrator 262 is set by the pulse of current through capacitor 260, a square pulse of current of selected magnitude appears on line 273 and stays there for a selected time depending on the time to charge capacitor 272. By changing the value of capacitance the time for reset can be changed up or down. Therefore the square wave pulse of voltage can be shortened or lengthened as desired.

This pulse of voltage on line 273 passes through resistor 274 and becomes a pulse current which is passed through the electrolytic cell 276 to ground. A plurality of pulses are integrated over the time of the test. Since a selected value of charge is passed for each pulse, the total charge passed through and integrated in the cell 276 becomes a measure of the number of pulses counted. As in the case of the cell 256, the cell 276 can be read out at the end of the test by applying a voltage in reverse and plating off the metal from the electrode and determining the time and current required to remove the plating.

Figure 7:
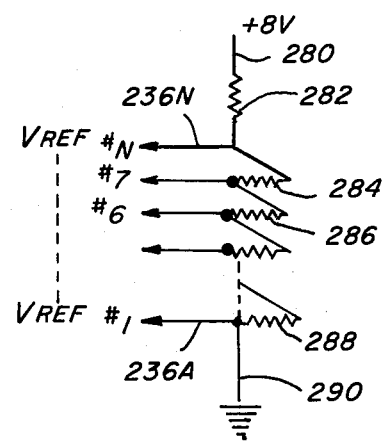
FIG. 7 illustrates one means for deriving a plurality of reference voltages.

FIG. 7 illustrates a network of series resistors 282, 284, 286, 288 etc. connected between a known regulated voltage on line 280, for example, and ground 290. The junctions between adjacent resistors are known values of voltage and leads 263A, ... 236N can be connected to the pairs of integrators and counters such as No. 1, No. 2, etc ... N.

Figure 8:
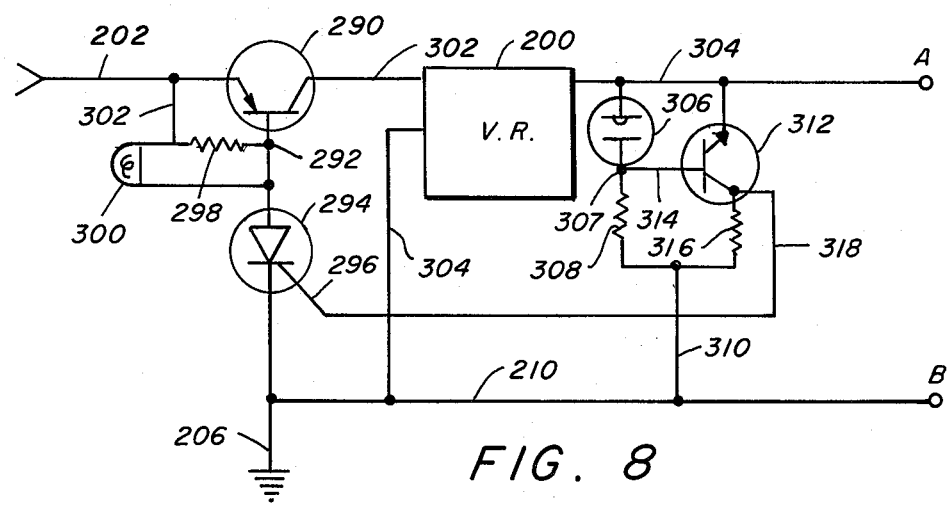
FIG. 8 illustrates an embodiment of the means for selecting value of time for the duration of the test, and for shutting down the experiment when that selected time duration is achieved.

In FIG. 8 is shown a variation of part of the circuit of FIG. 5, in which means are provided for controlling the time duration of a test. This is done by placing an electrolytic cell 306 across the output of the voltage regulator 200, that is, from line 304 through resistor 308 and line 310 to ground 206. This electrolytic cell 306 is preplated. That is, it has a predetermined amount of charge passed so as to plate a selected amount of metal from solution onto the electrode. When it is placed in the circuit in reverse connection, the voltage on line 304 and resistor 308 create a constant current flow through the electrolytic cell 306 in reverse, and cause the plating on the electrode to go into solution. When all the metal is unplated from the electrode, the electrolytic cell changes from a device of low resistance, to one of high resistance. When it presents a high resistance, the junction 307 drops in voltage. This junction is carried to the base of the transistor 312 and causes it to provide an increased voltage on line 318, which is carried to the control grid 296 of a voltage controlled diode 294.

The input voltage between lead 202 and ground 206, goes through a transistor 290 to the input 302 of the voltage regulator 200. Normally the voltage controlled diode 294 is open circuit and the potential at points 292 is the same as 202. That is the base of transistor 290 is high potential, and causes the transistor 290 to conduct and pass current to the voltage regulator via lead 302. On the other hand, when the voltage on lead 318 increases, it causes the diode 294 to conduct. Voltage on the junction 292 drops to a low value, and cuts off the flow of current through the transistor 290. This places a high voltage across the resistor 298, causing the lamp 300 which is connected across the resistor 298 to light.

Thus, by presetting the plating on the electrolytic cell 306 and inserting it into the circuit, it will conduct current for a selected total time that is adjustable by means of resistor 308. When the time is up, its internal resistance increases, causes the voltage to appear on lead 318 and to cause the diode 294 to conduct and cause the series transistor 290 to open and disconnect power from the voltage regulator and thus terminate the experiment. The voltage controlled diode 294 continues to conduct, however, which keeps the transistor 290 open and the indicator 300 lighted.

Figure 9:
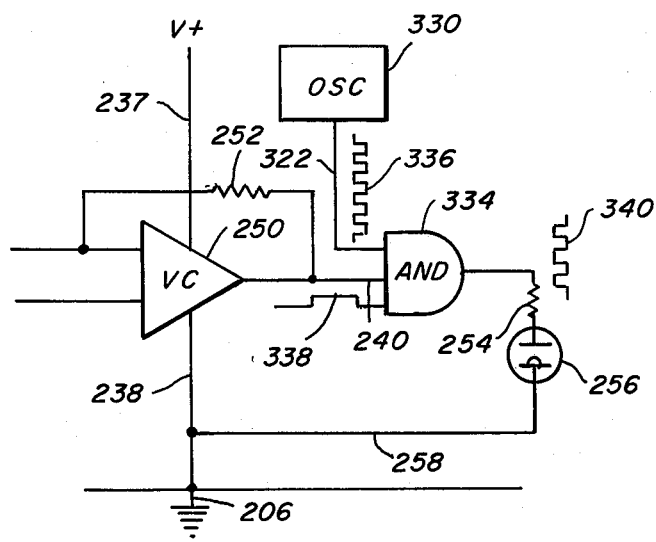
FIG. 9 illustrates an improved apparatus for utilization of the electrolytic cells.

In FIG. 9 is shown an improved circuit for using an electrolytic cell as a charge integrator. It has been found that a pulsating current passing through the cell is integrated more precisely than is a more or less constant current of the same average value. So the circuit of FIG. 6, box 232, has been modified in FIG. 9. In FIG. 6, the current from the voltage comparator 250 goes directly to the electrolytic cell through resistor 254. In FIG. 9 the output of the voltage comparator goes to an AND gate 334. The other lead to the AND gate 334 is a train of square waves from oscillator 330 via lead 322. The square waves on lead 322, shown as train 336 enables the AND gate 334 each time the lead 322 becomes positive. During these intervals when both leads 240 and 322 are positive, the output of the AND gate becomes positive. With an input voltage like the pulses 338 on lead 240, the output from the AND gate 334 will be like the train 340, having the duration of 338 and the frequency of 336. If the period of 336 is short compared to 338, the charge passed by 340 will be proportional to the charge in 338, and will be integrated more precisely than the charge in 338.

While the operation of the apparatus has been described to integrate the time duration that $E_s$ is greater than $E_r$, it could equally well be used to integrate time duration that $E_s$ is less than $E_r$. In general, the integration can be done to integrate time duration that $E_s$ varies in any selected way compared to $E_r$. It has been described as a system to integrate time that $E_s$ is greater than $E_r$, for convenience.

This invention involves a number of new and novel features, such as:

1. The voltage comparators are adapted to have a hysteresis characteristic, so that they turn on at a different value of voltage differential than they turn off.

2. The event counter involves a precise pulse shaper, so that the use of a charge integrating electrolytic cell can be used to precisely count the number of pulses.

3. Use of an electrolytic cell means to control the time duration of a test, and to automatically terminate the test when the time is up.

4. Using a pulsating charge to more precisely integrate the charge through an electrolytic cell.

5. Use of a precise voltage regulator.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In a statistical analog monitor for use in providing data related to the average duty cycle of a selected variable parameter of an operation, comprising:
   a. first means to measure the instantaneous value $E_s$ of said parameter in terms of a selected variable V;
   b. second means to compare the instantaneous value $E_s$ of said variable with at least one reference value $E_r$ of said variable;
   c. third means responsive to said second means to compare, to indicate the integrated time $T_s$ that $E_s$ is selectively different from $E_r$, during a total elapsed time $T_t$; and
   d. fourth means responsive to said second means to compare, to indicate the total number of separate times $N$ during the total elapsed time $T_t$ that $E_s$ is different from $E_r$;
   the improvement comprising;
      feedback means in conjunction with said second means to compare, whereby said second means exhibits hysteresis, in that it produces an output signal when the instantaneous value of said variable $E_s$ is equal to or greater than $E_r$ and stops producing said output signal when said variable $E_s$ is equal to or less than a value $E_r - \Delta E$, where $\Delta E$ is of a selected magnitude.

2. The analog monitor as in claim 1 in which said third means comprises electrolytic cell means in which a forwardly directed current causes a metal to be plated from a solution out onto a first electrode, and a current in the reverse direction causes said plated-out metal to be placed back into solution, the amount of metal plated-out, and placed into solution being proportional to the total charge transferred into and out of, respectively, said cell means.

3. The analog monitor as in claim 2 in which said means to compare produces a selected output voltage when said variable $E_s$ is selectively different from $E_r$ and including;
   a. oscillator means producing a train of square wave pulses of period much shorter than the duration of said selected output voltage; and
   b. AND gate means, said selected output voltage going to one input terminal, the oscillator output going to the other input terminal, and the gate output going to said electrolytic cell means.

4. The analog monitor as in claim 1 in which said fourth means responsive to said means to compare comprises pulse generator means and pulse counter means.

5. The analog monitor as in claim 4 in which said pulse generator means comprises monostable multivibrator means adapted to output a square wave pulse of voltage of selected constant amplitude and selected time duration each time that its input terminal changes in potential by a selected magnitude.

6. The analog monitor as in claim 5 in which said pulse counter means comprises electrolytic cell means to integrate the electrical charge in a succession of said square wave pulses.

7. The analog monitor as in claim 5 in which said pulse counter comprises an electrical pulse counter.

8. The statistical analog monitor as in claim 1 including means to provide a measure of the total time duration of a test, and to remove voltage from said statistical analog monitor at the end of a selected time period of test, comprising;
  a. electrolytic cell means connected across the input power leads to said monitor;
  b. gate means the output of which is connected to said electrolytic cell means;
  c. means to pre-plate a selected quantity of metal on a first electrode of said cell said electrolytic cell connected so that the applied potential will cause the preplated metal to pass into solution; and
  d. means responsive to the instant when all the preplated metal has passed into solution to open said gate.

9. The analog monitor as in claim 1 including fifth means to compare the instantaneous value $E_s$ of said variable with a second reference value $E_s$ of said variable with a second reference value $E_r'$ of said variable; sixth means responsive to sais fifth means to compare, to indicate the integrated time $T_t'$ that $E_s$ is greater than $E_r'$ during a total elapsed time $T$; and seventh means responsive to said fifth means to compare to indicate the total number of separate times $N'$ during the total elapsed time $T$ that $E_s$ is greater than $E_r'$ is greater than $E_r'$ during the total elapsed time $T$; and seventh means responsive to said fifth means to compare to indicate the total number of separate times $N'$ during the total elapsed time $T$ that $E_s$ is greater than $E_r'$.

10. The analog monitor as in claim 1 in which said first, second, third and fourth means are connected to a regulated source of voltage.

11. A method of gathering statistical operating data concerning a selected variable V in the operation of a selected apparatus, comprising the steps of;
  a. generating a voltage $E_s$ corresponding to the instantaneous value of said variable $V$;
  b. comparing said instantaneous value of voltage $E_s$ with a reference value of voltage $E_r$ corresponding to a reference value $V_r$ of said variable $V$;
  c. integrating a selected value of voltage during the successive times that said voltage $E_s$ is selectively different from $E_r$ in which said integration is carried out by passing a current $I_s$ proportional to $E_s$ through an electrolytic cell in which said metal is plated on a first electrode, the mass of metal plated being proportional to the time integral of $I_s$;
  d. generating an electrical current pulse of selective total charge, each time the voltage $E_s$ is selectively different from $E_r$;
  e. integrating a series of said current pulses in an electrolytic cell as in step (c); and where
  f. said second value of voltage is switched on when said $E_s$ bears a selected relation to $E_r$, and is shut off when $E_s$ bears the same relation to $E_r \pm \Delta E$, where $\Delta E$ can be positive or negative.

* * * * *